(12) United States Patent
Chen et al.

(10) Patent No.: US 7,093,117 B2
(45) Date of Patent: Aug. 15, 2006

(54) METHOD FOR AUTOMATICALLY GETTING CONTROL DATA FROM BIOS

(75) Inventors: Ata Chen, Taipei (TW); Macalas Yen, Taipei (TW); Simon Pu, Taipei (TW)

(73) Assignee: Via Technologies, Inc., Shindian (TW)

( * ) Notice: Subject to any disclaimer, the term of this patent is extended or adjusted under 35 U.S.C. 154(b) by 430 days.

(21) Appl. No.: 10/446,398

(22) Filed: May 28, 2003

(65) Prior Publication Data
US 2004/0015685 A1   Jan. 22, 2004

(30) Foreign Application Priority Data
Jul. 16, 2002   (TW) ................... 91115872

(51) Int. Cl.
*G06F 9/00* (2006.01)
(52) U.S. Cl. ................ 713/1; 713/2; 713/100
(58) Field of Classification Search .......... 713/1, 713/2, 100
See application file for complete search history.

(56) References Cited

U.S. PATENT DOCUMENTS

| | | | | |
|---|---|---|---|---|
| 5,446,898 A | * | 8/1995 | Bealkowski et al. | 713/1 |
| 5,465,357 A | * | 11/1995 | Bealkowski et al. | 713/2 |
| 5,495,611 A | * | 2/1996 | Bealkowski et al. | 713/2 |
| 5,701,477 A | * | 12/1997 | Chejlava, Jr. | 713/2 |
| 5,860,001 A | * | 1/1999 | Cromer et al. | 713/1 |
| 5,887,163 A | * | 3/1999 | Nguyen et al. | 713/2 |
| 6,178,503 B1 | * | 1/2001 | Madden et al. | 713/2 |
| 6,457,123 B1 | * | 9/2002 | Rollins | 713/100 |
| 6,718,401 B1 | * | 4/2004 | Nalawadi et al. | 710/13 |
| 6,760,784 B1 | * | 7/2004 | Bodin et al. | 719/323 |
| 6,763,458 B1 | * | 7/2004 | Watanabe et al. | 713/2 |
| 6,785,834 B1 | * | 8/2004 | Chefalas et al. | 714/4 |
| 6,944,867 B1 | * | 9/2005 | Cheston et al. | 719/327 |

\* cited by examiner

*Primary Examiner*—Chun Cao
*Assistant Examiner*—Suresh K Suryawanshi
(74) *Attorney, Agent, or Firm*—Madson & Austin

(57) ABSTRACT

A method for a drive device to get control data from a basic input/output system (BIOS) includes the following steps. Firstly, an index zone is automatically provided according to a specified version of the BIOS for storing an index of control data associated with the specified version of the BIOS. Then, the drive device gets the control data associated with the specified version of the BIOS from the BIOS according to the index.

19 Claims, 5 Drawing Sheets

US 7,093,117 B2

METHOD FOR AUTOMATICALLY GETTING CONTROL DATA FROM BIOS

FIELD OF THE INVENTION

The present invention relates to a method for automatically getting control data, and more particularly to a method for automatically getting refreshed control data from a Basic Input/Output System (BIOS).

BACKGROUND OF THE INVENTION

FIG. 1 is a schematic diagram showing the presence of the copies of control data for controlling a hardware device in prior art. The control data Sc, which generally consists of a plurality of micro-control instructions, is stored in a storage zone 110 of a BIOS 11, and a corresponding copy thereof is stored in a storage zone 120 independent from the storage zone 110. The operation of a hardware device 13, for example a chip of a peripheral device, is controlled by a drive device 12 according to the control data Sc stored in the storage zone 120. In a case that the drive device 12 is a driver program consisting of a plurality of assembly language instructions, the control data Sc can be directly incorporated into drive device 12.

When the version of BIOS 11 is upgraded, the control data Sc stored in the storage zone 120 should be manually refreshed along with the control data Sc stored in the storage zone 110. That is, the control data Sc stored in the storage zone 110 of the upgraded BIOS 11 should be duplicated to the storage zone 120 or the drive device 12 to refresh the control data Sc previously stored for the use of the hardware device 13. Otherwise, the operation of the hardware device 13 will be malfunctioned.

Since the duplication of the control data Sc provided for the hardware device 13 to be consistent to that stored in the upgraded BIOS 11 is performed manually, some disadvantages are rendered in practice. For example, it is laboring-inefficient to synchronize the copies of the control data. On the other hand, if the copies of the control data are not properly synchronized, the hardware device 13 may experience serious adverse effects or even cashed down.

SUMMARY OF THE INVENTION

It is an object of the present invention to provide a method for automatically getting control data from BIOS so as to avoid the inconvenience in duplicating the control data or possible mistake in refreshing the control data.

In accordance with a first aspect of the present invention, there is provided a method for a drive device to get control data from a basic input/output system (BIOS). Firstly, an index zone is automatically provided according to a specified version of the BIOS for storing an index of control data associated with the specified version of the BIOS. Then, the drive device gets the control data associated with the specified version of the BIOS from the BIOS according to the index.

Preferably, the index is an address data.

Preferably, the index zone is an address index table for storing offset addresses of the control data. More preferably, the address index table is an address map file.

In an embodiment, the index zone is provided by a compiler procedure performed by the BIOS when the BIOS is updated to the specified version.

In an embodiment, the control data comprises a plurality of micro-control instructions.

In an embodiment, the drive device is a driver program of a peripheral hardware device, comprising a plurality of assembly language instructions.

In an embodiment, the BIOS is a VGA (video graphics array) BIOS or a system BIOS of a main board.

In accordance with a second aspect of the present invention, there is provided a method for a drive device to get control data from a basic input/output system (BIOS). Firstly, an index zone is automatically provided according to a specified version of the BIOS for storing an index of control data associated with the specified version of the BIOS. Then, a reference table is provided, wherein the reference table stores therein control data automatically and synchronously chronously updated with the control data in the BIOS according to the index. Then the drive device gets the control data associated with the specified version of the BIOS from the reference table.

In an embodiment, the index zone and the reference table are provided by a compiler procedure performed by the BIOS when the BIOS is updated to the specified version.

In an embodiment, the reference table is stored in a system memory.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Hereinafter, how a drive device to get control data from a basic input/output system (BIOS) to control a hardware device is described. The BIOS, for example, can be a VGA (video graphics array) BIOS or a System BIOS of a main board. The control data generally consists of a plurality of micro-control instructions. The hardware device is, for example, a chip of a peripheral device. The drive device is, for example, a driver program consisting of a plurality of assembly language instructions, and the control data can be directly incorporated into the drive device.

Figure 1:
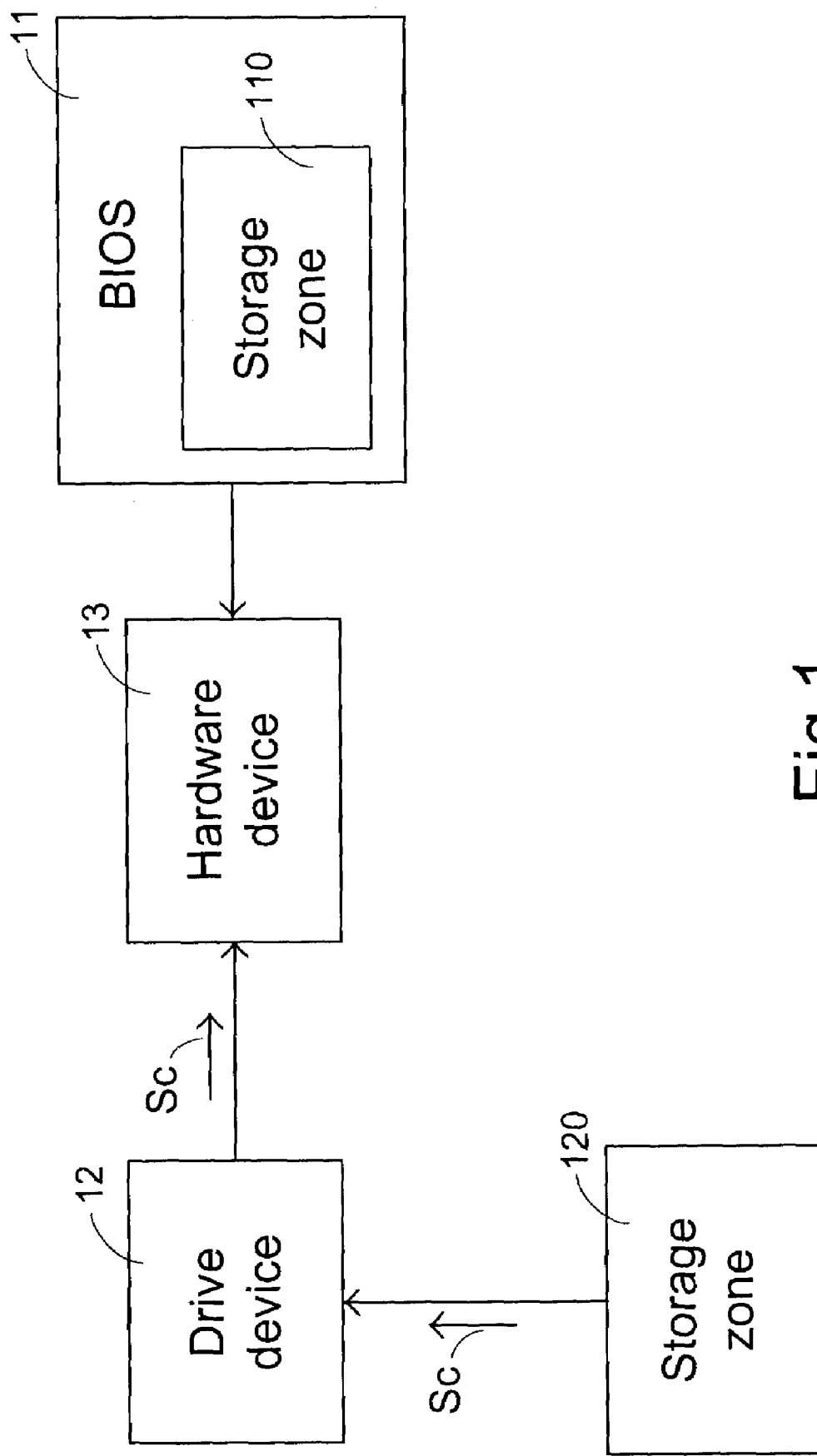
FIG. 1 is a schematic block diagram showing the presence of the copies of control data for controlling a hardware device in prior art.
Figure 2A:
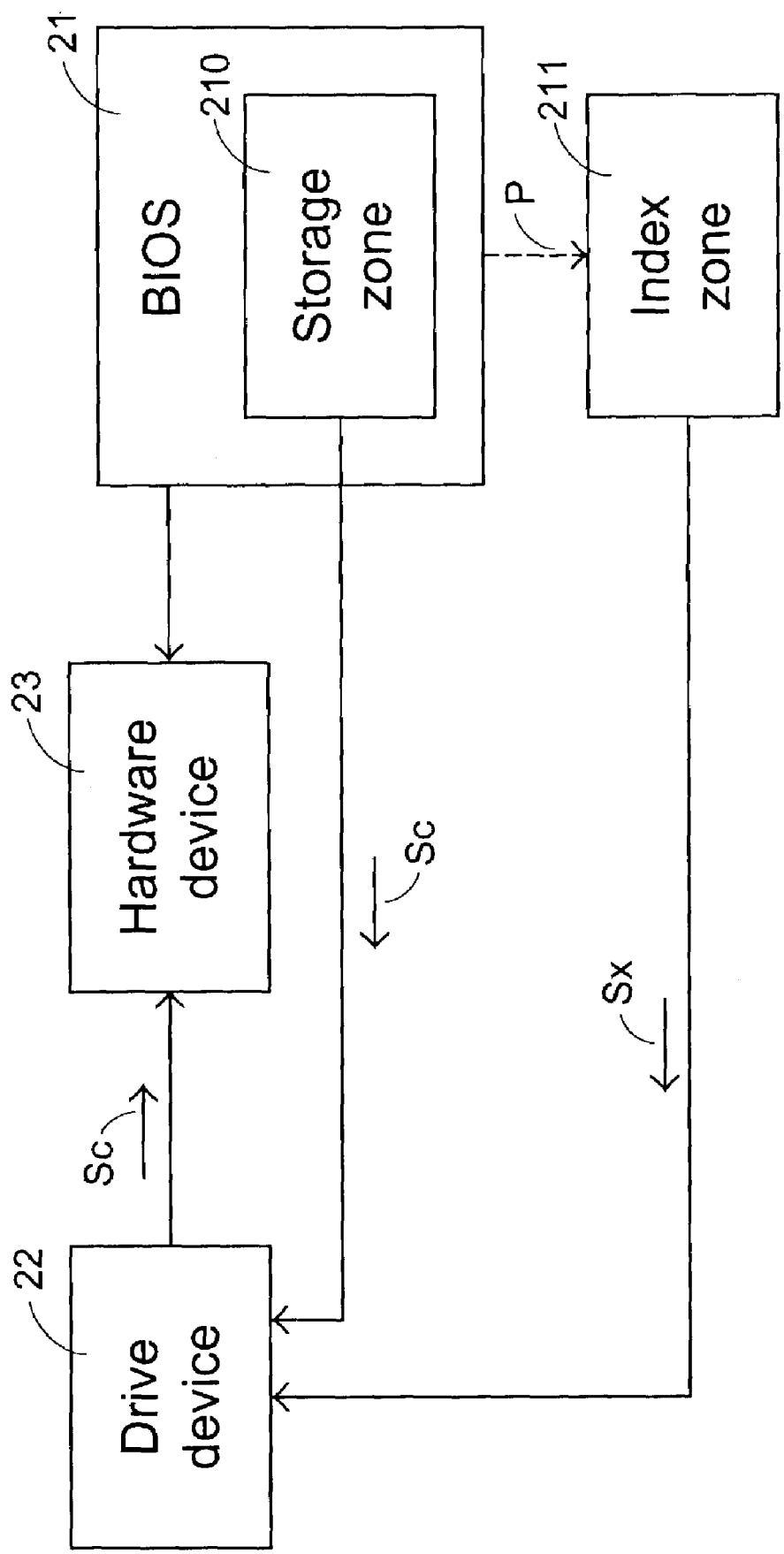
FIG. 2(a) is a schematic block diagram showing the path for a drive device to get control data from a basic input/output system to control a hardware device according to a preferred embodiment of the present invention.

Please refer to FIG. 2(a), a control data Sc required by a drive device 22 to control a hardware device 23 is stored in a storage zone 210 of a BIOS 21. In this embodiment, an index zone 211 is provided for storing therein an index Sx corresponding to the control data Sc in the storage zone 210. By reading the index Sx from the index zone 211, the drive device 22 can directly get the control data Sc from the storage zone 210 of the BIOS 21, and control the hardware device 23 accordingly. The index zone 211 is obtained by a compiler procedure P performed by the BIOS 21. In this embodiment, the index zone 211 is disposed independent from the BIOS 21. Alternatively, the index zone 211 may be disposed in the BIOS 21.

Figure 2B:
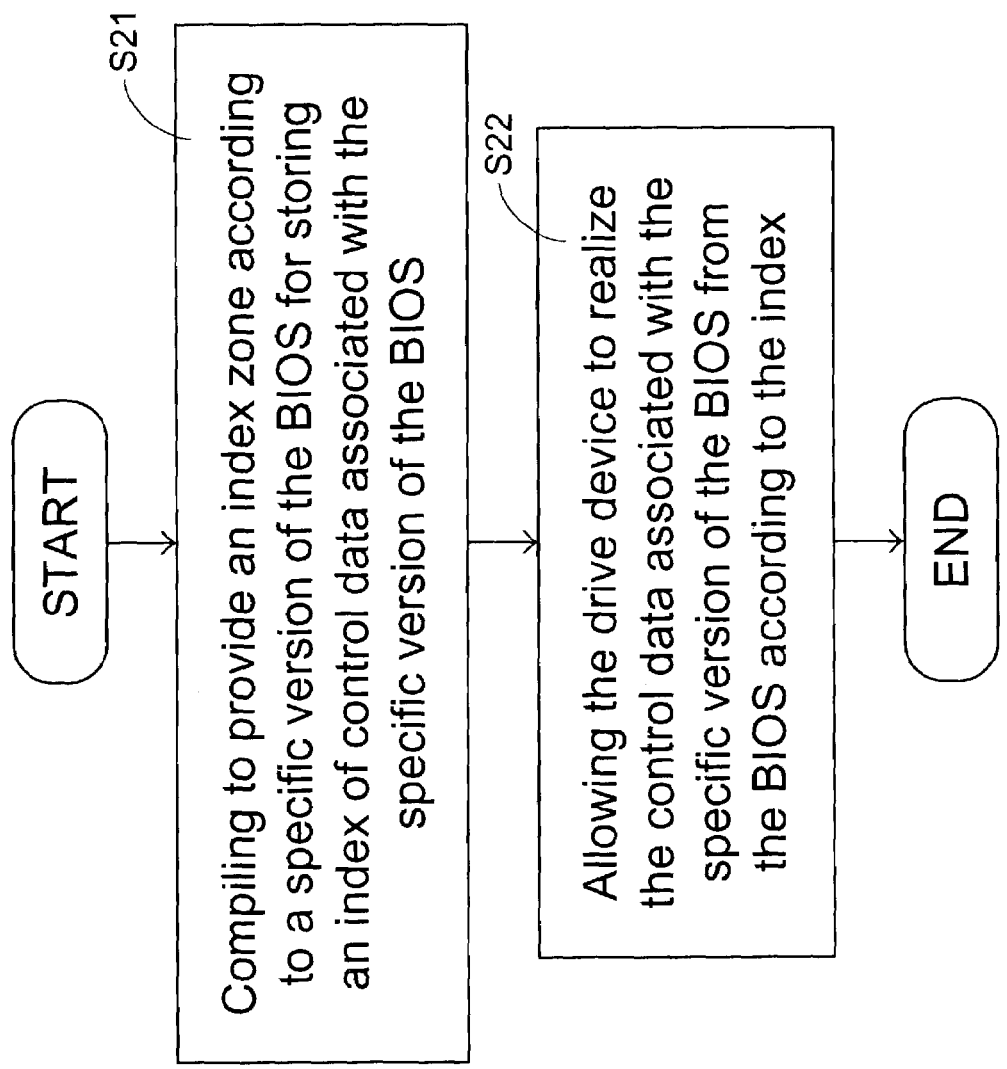
FIG. 2(b) is a flowchart illustrating a method for the drive device to get the control data from the BIOS in FIG. 2(a)

Whenever the version of BIOS 21 is upgraded, an updated index zone 211 is automatically generated by a compiler procedure P performed by the BIOS 21. The index zone 211 stores therein the index Sx corresponding to the control data Sc associated with the specified version of the BIOS 21. Then, according to the index Sx, the drive device 22 gets the control data Sc associated with the specified version of the BIOS 21 from the storage zone 210. In such way, the refreshed control data Sc can be automatically obtained. The steps for the drive device 22 to get the control data Sc from the BIOS 21 are summarized in the flowchart of FIG. 2(*b*). In this embodiment, the index Sx can be an address data, and the index zone 211 is an address index table for storing offset addresses of the control data Sc accordingly. Specifically, the address index table is an address map file.

Figure 3A:
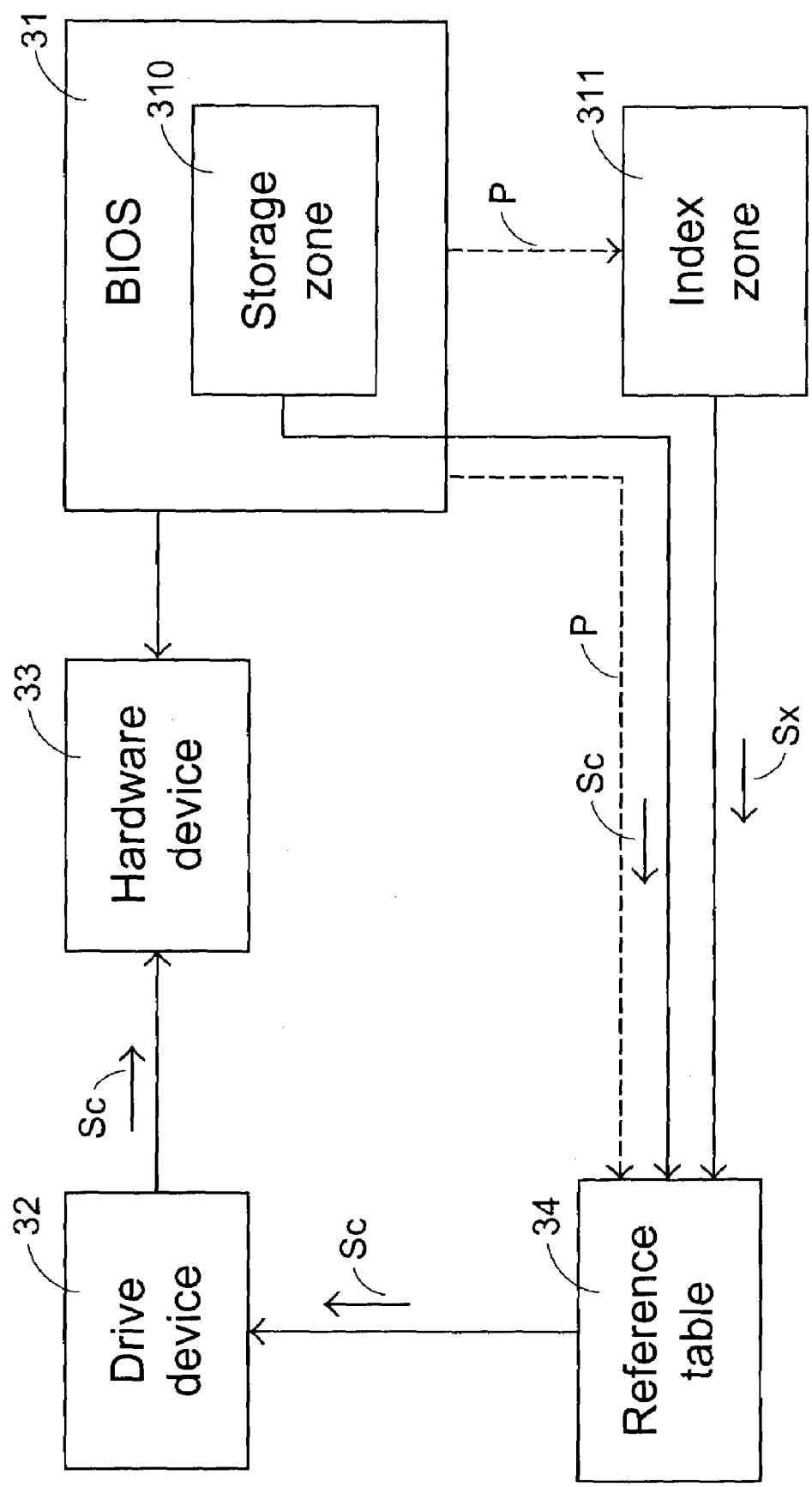
FIG. 3(a) is a schematic block diagram showing the path for a drive device to get control data from a basic input/output system according to another preferred embodiment of the present invention.
Figure 3B:
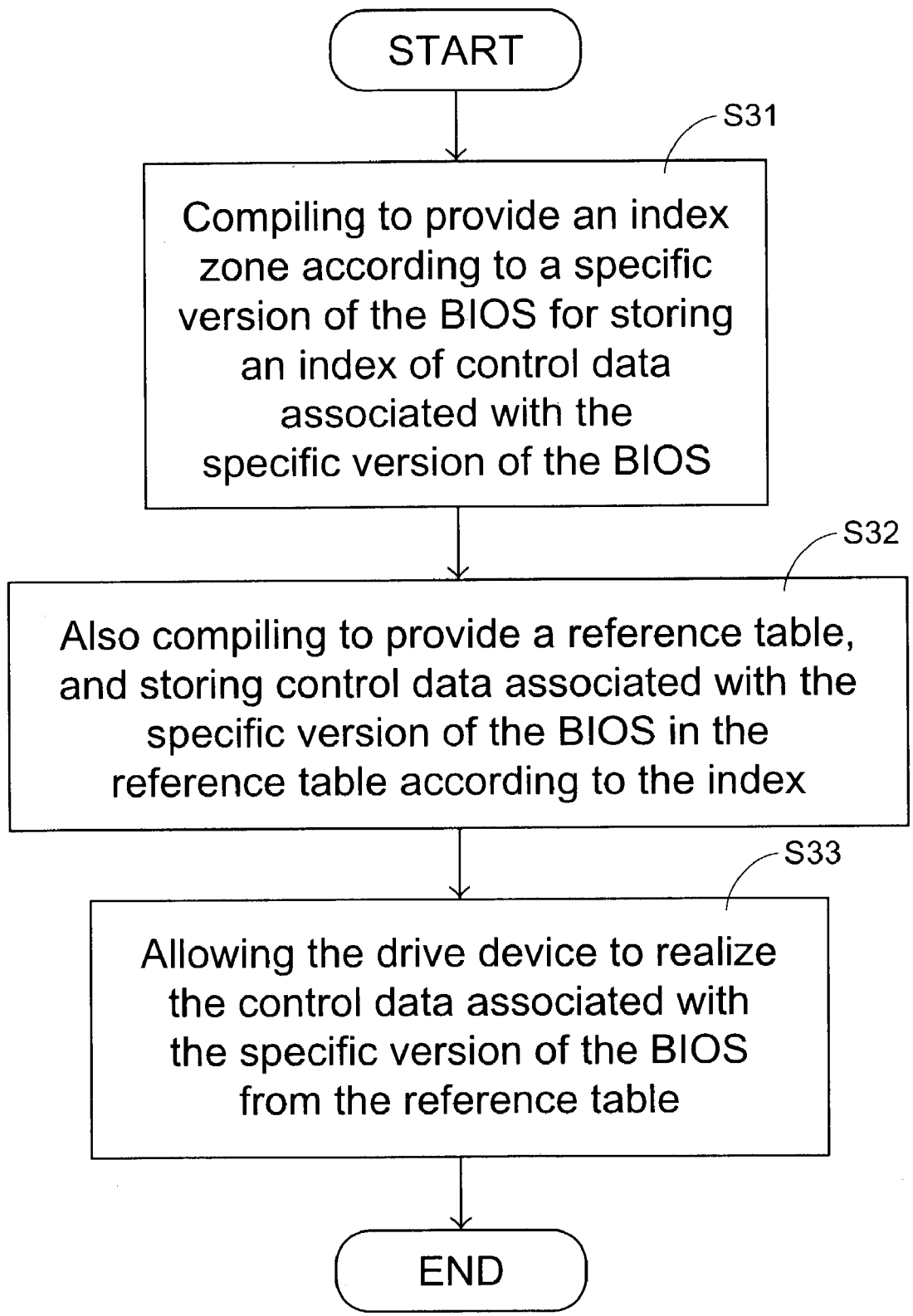
FIG. 3(b) is a flowchart illustrating a method for the drive device to get the control data from the BIOS in FIG. 3(a).

FIG. 3(*a*) is a schematic block diagram showing the path for a drive device to get control data from a basic input/output system to control a hardware device according to another preferred embodiment of the present invention. The BIOS, for example, can be a VGA (video graphics array) BIOS or a System BIOS of a main board. The control data generally consists of a plurality of micro-control instructions. The hardware device is, for example, a chip of a peripheral device. The drive device is, for example, a driver program consisting of a plurality of assembly language instructions, and the control data can be directly incorporated into the drive device.

Please refer to FIG. 3(*a*), a control data Sc required by a drive device 32 to control a hardware device 33 is stored in a storage zone 310 of a BIOS 31. In this embodiment, an index zone 311 is provided for storing therein an index Sx corresponding to the control data Sc in the storage zone 310. The index zone 311 as shown is disposed independent from the BIOS 31. However, the index zone 311 can also be disposed in the BIOS 31 to achieve the same effect. The index zone 311 is obtained by a compiler procedure P performed by the BIOS 31. Furthermore, a reference table 34 is also built by a compiler procedure P performed by the BIOS 31. By referring to the index Sx, the control data Sc is stored in the reference table 34, so that the drive device 32 can directly get the control data Sc from the reference table 34, and control the hardware device 33 accordingly.

When the version of BIOS 31 is upgraded, an updated index zone 311 and an updated reference table 34 are automatically generated by a compiler procedure P performed by the BIOS 31. The index zone 311 stores therein the index Sx corresponding to the control data Sc associated with the specified version of the BIOS 31. Thus the reference table 34 stores therein the control data Sc associated with the specified version of the BIOS 31. In other words, the reference table 34 stores therein the control data automatically and synchronously updated with the control data Sc in the BIOS. From the reference table 34, the drive device 32 will get the control data Sc associated with the specified version of the BIOS 31. In such way, the refreshed control data Sc can be automatically obtained. The steps for the drive device 32 to get the control data Sc from the BIOS 31 are summarized in the flowchart of FIG. 3(*b*). The index Sx, for example, can be an address data, and the index zone 311 is an address index table for storing offset addresses of the control data Sc accordingly. Specifically, the address index table is an address map file. Preferably, the preference table 34 is stored in a system memory.

Since the control data Sc provided for the drive device is automatically refreshed whenever the BIOS is upgraded, the inconvenience resulting from manually duplicating the control data as in the prior art or the possible mistake in refreshing the control data can be effectively avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for a drive device to get control data from a basic input/output system (BIOS), comprising steps of:
   providing an index zone for storing an index of control data associated with said BIOS;
   automatically updating said index stored in said index zone when said BIOS is updated; and
   allowing said drive device to automatically get updated control data from said updated BIOS according to said updated index.

2. The method according to claim 1 wherein said index is an address data.

3. The method according to claim 1 wherein said index zone is an address index table for storing offset addresses of said control data.

4. The method according to claim 3 wherein said address index table is an address map file.

5. The method according to claim 1 wherein said index stored in said index zone is updated by a compiler procedure performed by said BIOS when said BIOS is updated.

6. The method according to claim 1 wherein said control data comprises a plurality of micro-control instructions.

7. The method according to claim 1 wherein said drive device is a driver program of a peripheral hardware device, comprising a plurality of assembly language instructions.

8. The method according to claim 1 wherein said BIOS is a VGA (video graphics array) BIOS.

9. The method according to claim 1 wherein said BIOS is a System BIOS of a main board.

10. A method for a drive device to get control data from a basic input/output system (BIOS), comprising steps of:
    providing an index zone for storing an index of control data associated with said BIOS;
    providing a reference table for storing control data associated with said BIOS;
    automatically updating said index stored in said index zone and updating said control data stored in said reference table according to said index when said BIOS is updated; and
    allowing said drive device to automatically get said updated control data from said reference table.

11. The method according to claim 10 wherein said index is an address data.

12. The method according to claim 10 wherein said index zone is an address index table for storing offset addresses of said control data.

13. The method according to claim 12 wherein said address index table is an address map file.

14. The method according to claim 10 wherein said index zone and said reference table are provided by a compiler procedure performed by said BIOS.

15. The method according to claim 10 wherein said reference table is stored in a system memory.

16. The method according to claim 10 wherein said control data comprises a plurality of micro-control instructions.

17. The method according to claim 10 wherein said drive device is a driver program of a peripheral hardware device, comprising a plurality of assembly language instructions.

18. The method according to claim 10 wherein said BIOS is a VGA (video graphics array) BIOS.

19. The method according to claim 10 wherein said BIOS is a System BIOS of a main board.

* * * * *